United States Patent [19]

Watanabe et al.

[11] 4,314,850
[45] Feb. 9, 1982

[54] ANTIFOULING COATING COMPOSITION

[75] Inventors: Takashi Watanabe; Katsushi Yamano; Kunio Yamamoto; Shigeo Inomata, all of Hiratsuka, Japan

[73] Assignee: Kansai Paint Co., Ltd., Hyogo, Japan

[21] Appl. No.: 119,146

[22] Filed: Feb. 6, 1980

Related U.S. Application Data

[63] Continuation of Ser. No. 953,252, Oct. 20, 1978, abandoned.

[30] Foreign Application Priority Data

Oct. 26, 1977 [JP] Japan ............................. 52/128528

[51] Int. Cl.³ .............................................. C09D 5/14
[52] U.S. Cl. ............................. 106/15.05; 106/18.33; 260/31.2 MR; 260/31.2 XA; 260/31.2 R; 260/31.4 R; 260/32.8 R; 260/32.8 A; 260/32.8 N; 260/33.6 A; 260/33.6 PQ; 260/33.6 UA; 260/33.6 R; 260/33.4 R; 260/33.4 PQ; 427/388.5; 428/461; 428/462
[58] Field of Search ................. 260/45.75 H, 45.75 K, 260/45.75 C, 31.2 MR, 31.2 XA, 31.2 R, 31.4 R, 32.8 R, 32.8 A, 32.8 N, 33.6 A, 33.6 PQ, 33.6 UA, 33.6 R, 33.4 R, 33.4 PQ; 106/15.05, 18.33; 427/388 R, 388 D, 388.5

[56] References Cited

FOREIGN PATENT DOCUMENTS 51-114432 10/1976 Japan .

OTHER PUBLICATIONS

Woods Hole Oceanographic Institution, Marine Fouling and Its Prevention, pp. 285–288 and 315–317 (1952).
Bennett and Zedler, J. Oil Col. Chem. Assoc., 49, pp. 928–953 (1966).

*Primary Examiner*—Melvyn I. Marquis
*Attorney, Agent, or Firm*—Wenderoth, Lind & Ponack

[57] ABSTRACT

An antifouling coating composition having superior antifouling properties and stability over an extended period of time, said composition comprising
(A) an antifouling agent composed of (i) 10 parts by weight of a triphenyltin compound of the formula

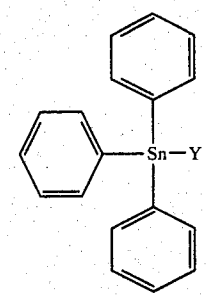
(I)

wherein Y represents —OH, halogen,

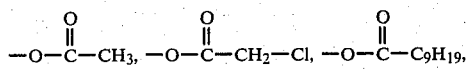

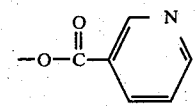

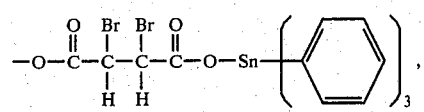

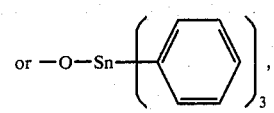

and (ii) 10 to 60 parts by weight of cuprous oxide and/or cuprous thiocyanate,
(B) a resinous vehicle composed of a resin having an acid value of not more than 10 as a main ingredient, and
(C) an organic solvent, said resinous vehicle being present in an amount of 6 to less than 10 parts by weight per 10 parts by weight of the triphenyltin compound, said antifouling agent amounting to 37 to 75% by weight based on the weight of the coating composition, and said composition having a pigment volume concentration of 50 to 80% by volume.

14 Claims, No Drawings

ANTIFOULING COATING COMPOSITION

This is a continuation of application Ser. No. 953,252, filed Oct. 20, 1978, and now abandoned.

This invention relates to a novel antifouling coating composition, and more specifically, to an insoluble matrix type antifouling coating composition comprising a combination of a triphenyltin compound and cuprous oxide and/or cuprous thiocyanate as an antifouling agent, which has superior antifouling properties and stability over long periods of time and is especially suitable for application to the surfaces of substrates to be exposed to sea water.

Various antifouling coating compositions have heretofore been used as coatings on the surfaces of substrates to be exposed to water, for example, sea water, river water, marsh water, or lake water, especially on the submerged surfaces of ships and marine structures, over long periods of time in order to prevent adhesion or habitation of aquatic living organisms, for example Cirripedia such as barnacles (Balanus), and algae such as green laver (Enteromorpha). They commonly consist of a film-forming resinous binder, a toxicant for controlling fouling organisms (i.e., an antifouling agent), and a liquid medium for dissolving or dispersing these ingredients, and are roughly classified into the soluble matrix type and the insoluble matrix type according to the mode of dissolution of the toxicant in water.

A coating composition of the soluble matrix type is prepared usually by mixing an antifouling agent with a resinous vehicle composed of resin as a main ingredient. The rosin having abietic acid as a main ingredient gradually dissolves from the coated surface in sea water which is weakly alkaline. As a result, the antifouling agent always dissolves from the eroded coating to exhibit its antifouling property. Accordingly, it has the advantage that an antifouling effect can be obtained by using a relatively small amount of the toxicant. [See, for example, Woods Hole Oceanographic Institution, Marine Fouling and Its Prevention, page 316 (1952).] For this reason, most of antifouling paint compositions now on the market are of the soluble matrix type.

On the other hand, a coating composition of the insoluble matrix type is prepared typically by incorporating a binder based on a film-forming water-insoluble resin such as polyvinyl chloride intimately with as high as 50 to 70% by weight, based on the weight of the coating composition, of cuprous oxide powder as an antifouling agent so that only the cuprous oxide can dissolve gradually from the coated film over an extended period of time [see, for example, Woods Hole Oceanographic Institution, Marine Fouling and Its Prevention, page 285 (1952)]. The composition of this type has the defect that a large amount of the antifouling agent must be added, and if its amount is small, the amount of the antifouling agent to be dissolved in the sea water from the coated film decreases within short periods of time and the antifouling effect does not last long. Furthermore, since the insoluble matrix type coating composition contains such a large amount of antifouling agent, it is likely that the antifouling agent in the composition will precipitate during storage to form a hard cake. Furthermore, such a composition adversely affects the coating operation. For this reason, this type of antifouling composition has had only limited acceptance. Triphenyltin compounds and other organic compounds have also been suggested as useful antifouling agents for insoluble matrix type antifouling coating compositions [see, for example, R. F. Bennett and R. J. Zedler, J. Oil Col. Chem. Assoc., 49, 928, (1966)]. These antifouling agents, however, are more expensive than cuprous oxide, and their antifouling effects decrease greatly with time. Moreover, they have another serious defect that the coated film dipped in sea water is susceptible to crack formation.

It is an object of this invention therefore to provide an antifouling coating composition of the insoluble matrix type which has improved properties.

Another object of this invention is to provide an antifouling coating composition of the insoluble matrix type which has superior storage stability and gives a coating having superior antifouling properties over an extended period of time without cracking or peeling.

Still another object of this invention is to provide a method for protecting the surface of a substrate to be contacted with water for a long period of time, such as a ship, from the adhesion of aquatic organisms by using the aforesaid antifouling coating composition.

These and other objects and advantages of this invention will become more apparent from the following description.

According to the present invention, there is provided an antifouling coating composition having superior antifouling properties and stability over an extended period of time, said composition comprising (A) an antifouling agent composed of (i) 10 parts by weight of a triphenyltin compound of the formula

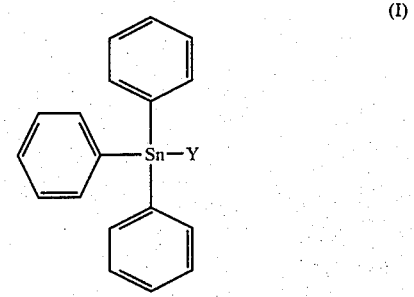

wherein Y represents —OH, halogen,

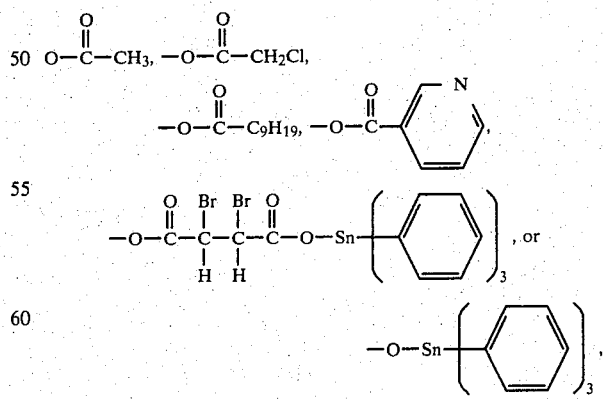

and (ii) 10 to 60 parts by weight of cuprous oxide and/or cuprous thiocyanate, (B) a resinous vehicle composed of a resin having an acid value of not more than 10 as a main ingredient, and (C) an organic solvent, said resinous vehicle being present in an amount of 6 to less than 10 parts by weight per 10 parts by weight of the triphenyltin compound, said antifouling agent amounting to 37 to 75% by weight based on the weight of the coating composition, and said composition having a pigment volume concentration (as defined hereinbelow) of 50 to 80% by volume.

A first feature of the coating composition provided by the present invention lies in the use of a combination of the triphenyltin compound of formula (I) and cuprous oxide and/or cuprous thiocyanate as an antifouling agent.

In formula (I), the halogen is fluorine, chlorine, bromine or iodine. Of these, chlorine and fluorine are preferred.

Typical examples of the triphenyltin compound include triphenyltin hydroxide, triphenyltin chloride, triphenyltin fluoride, triphenyltin acetate, triphenyltin monochloroacetate, triphenyltin versatate, triphenyltin nicotinate, bis-triphenyltin dibromosuccinate, and bis(triphenyltin) oxide. Of these, triphenyltin hydroxide, triphenyltin chloride and triphenyltin acetate, especially the first two, are preferred. These triphenyltin compounds are used either singly or as a mixture of two or more.

The proportions of the triphenyltin compound and cuprous oxide ($Cu_2O$) and/or cuprous thiocyanate (CuSCN) used in this invention are 10 to 60 parts of cuprous oxide and/or cuprous thiocyanate per 10 parts by weight of the triphenyltin compound. Especially advantageously, the amount of cuprous oxide and/or cuprous thiocyanate can be 20 to 60 parts by weight per 10 parts by weight of the triphenyltin compound.

The amount of the antifouling agent composed of the triphenyltin compound and cuprous oxide and/or cuprous thiocyanate is 37 to 75% by weight, preferably 40 to 73% by weight, based on the weight of the final coating composition.

The triphenyltin compound, cuprous oxide and cuprous thiocyanate can be used in a fine powder form. The particle size of the fine powder is not particularly restricted.

Although the antifouling agent composed of the triphenyltin compound and cuprous oxide and/or cuprous thiocyanate exhibits a sufficient effect in the invention, it is possible, if desired, to use not more than 30 parts by weight, per 10 parts by weight of the triphenyltin compound, of at least one other known antifouling compound, for example, organic sulfur compounds such as a tetraalkylthiuram disulfide, trialkyltin compounds such as tributyltin fluoride and tributyltin dibromosuccinate, and organic zinc compounds such as zinc dialkyldithiocarbamate.

A second feature of the coating composition of this invention lies in the use of a resinous vehicle having an acid value of not more than 10, preferably not more than 5, most preferably not more than 3, as a matrix in which the antifouling agent is to be dispersed. The resinous vehicle may consist substantially of a film-forming, substantially water-insoluble resin having the specified acid value.

Resins which are conventionally used as a resinous vehicle in insoluble matrix type coating compositions can be used as the water-insoluble resin. Examples are acrylic resins, vinyl resins, diene-type resins, olefinic resins and rubber-type resins. The acrylic resins, vinyl resins and diene-type resins are preferred. From these resins, those which are soluble in the organic solvents to be described are selected for use in the coating composition of this invention.

Resins which can be suitably used in this invention are described in greater detail below.

(1) Acrylic resins

These acrylic resins include homopolymers of acrylic esters such as methyl acrylate, ethyl acrylate, n-propyl acrylate, isopropyl acrylate, n-butyl acrylate, isobutyl acrylate, 2-ethylhexyl acrylate, 2-hydroxyethyl acrylate, or 2-hydroxypropyl acrylate, methacrylic esters such as methyl methacrylate, ethyl methacrylate, n-propyl methacrylate, isopropyl methacrylate, n-butyl methacrylate, isobutyl methacrylate, 2-ethylhexyl methacrylate, cyclohexyl methacrylate, 2-hydroxyethyl methacrylate and 2-hydroxypropyl methacrylate, unsaturated nitriles such as acrylonitrile and methacrylonitrile, and acrylamides or methacrylamides such as acrylamide, N-methylol acrylamide, methacrylamide, N-methylol methacrylamide, diacetone acrylamide, diacetone methacrylamide, and methylolated diacetone acrylamide; copolymers of two or more of these monomers; and copolymers of at least 50% by weight of at least one of these monomers and the remainder being another monomer copolymerizable with it, such as styrene, vinyltoluene, vinyl acetate and vinyl propionate. Advantageously, these acrylic resins have a number average molecular weight of at least 5,000, preferably 10,000 to 30,000.

(2) Vinyl resins

These resins include, for example, homopolymers of vinyl monomers such as vinyl chloride, vinylidene chloride, vinyl acetate, vinyl propionate, styrene and acrylonitrile; copolymers of two or more of these vinyl monomers; and copolymers of at least 50% by weight of at least one of these vinyl monomers and the remainder being another monomer copolymerizable with it, such as ethylene, propylene, butadiene and vinyl isobutyl ether. Advantageously, these vinyl resins have a number average molecular weight of at least 5,000, preferably 10,000 to 50,000.

(3) Diene-type resins

These resins include homopolymers of diene-type monomers such as butadiene, isoprene and chloroprene; copolymers of at least two of these diene monomers; and copolymers of at least 10% by weight of at least one of these diene monomers and the remainder being at least one monomer copolymerizable with it, such as styrene or acrylonitrile. These diene-type resins may have a number average molecular weight of at least 5,000, preferably 10,000 to 50,000.

(4) Olefinic resins

The olefinic resins include, for example, homopolymers of olefin monomers such as ethylene or propylene, copolymers of at least two of these olefin monomers, and copolymers of at least 50% by weight of at least one of these olefin monomers and the remainder being at least one comonomer copolymerizable with it, such as vinyl acetate. Suitably, these olefinic resins have a number average molecular weight of at least 5,000, especially at least 10,000. Chlorinated polyethylene and chlorinated polypropylene can also be used advantageously as the olefinic resin.

(5) Other resins

These are, for example, rubber-type resins such as chlorinated rubber or cyclized rubber.

When the aforesaid resins are as resinous vehicles in the coating composition of this invention, they may be plasticized as required. Any plasticizers can be used which have compatibility with these resins and can impart flexibility to these resins or increase their flexibility. Those which are free from carboxyl groups are suitable. Examples of the plasticizers are phosphates such as tricresyl phosphate, chlorinated paraffins such as chlorinated n-paraffin, phthalates such as isodecyl phthalate, polyester resins such as "Polycizer P-29" (a trademark for a product of Dainippon Ink and Chemicals Co., Ltd.), and epoxidized oils such as "Adekacizer 130P" (a trademark for a product of Adeka-Argus Chemical Co., Ltd.). These plasticizers may be used singly or as a mixture of two or more. The amount of the plasticizer used is not critical, and can be varied over a wide range according to the type of the resin to be plasticized. But generally, it is advantageous to use the plasticizer in an amount of not more than 50 parts by weight, preferably up to 30 parts by weight, per 100 parts by weight of the resin.

In the present application, the term "resinous vehicle" is used to embrace not only the aforesaid resins, but also such plasticized resins.

The weight of the resinous vehicle is smaller than that of the triphenyltin compound of formula (I). Specifically, the amount of the resinous vehicle is at least 6 parts by weight but less than 10 parts by weight per 10 parts by weight of the triphenyltin compound. Good results can be obtained when the amount is 6 to 9 parts by weight.

The organic solvent used to dissolve the resinous vehicle may be any organic solvents which substantially dissolve the resinous vehicle to a solubility of at least 150 g/liter and are compatible with the antifouling agent. Generally, examples of advantageously used organic solvents are aromatic hydrocarbons such as benzene, toluene and xylene, ketones such as methyl ethyl ketone and methyl isobutyl ketone, esters such as ethyl acetate and ethylene glycol monoethyl ether acetate, and alcohols such as methanol, ethanol and isopropanol. The organic solvents may be used singly or as a mixture of two or more.

The amount of the organic solvent is not critical, and can be varied widely according to the type and amount of the resinous vehicle.

If desired, the coating composition of this invention may further contain suitable amounts of additives used in conventional insoluble matrix type coating compositions, for example coloring pigments such as red iron oxide, carbon black, prussian blue, and chrome green, and extender pigments or fillers such as talc, clay and barium sulfate.

Since the triphenyltin compound of formula (I) and cuprous oxide and/or cuprous thiocyanate are a kind of pigment, the coating compositions of the invention advantageously contains the triphenyltin compound and cuprous oxide and/or cuprous thiocyanate and the coloring pigment and extender pigment in a total pigment volume concentration (to be abbreviated PVC) of 50 to 80% by volume, preferably 60 to 80% by volume. Thus, when the PVC of the coating composition does not fall within the specified range, particularly when the triphenyltin compound and cuprous oxide and/or cuprous thiocyanate are the only pigments present in the composition, it is possible to adjust the PVC of the composition by using the aforesaid coloring pigment and/or extender pigment.

The term "pigment volume concentration", as used in the application, denotes the percentage by volume of the pigments in the total volume of a dried coated film prepared by forming a film from the coating composition and then drying the film at 20° C. for 1 week.

The structure of the coating composition of this invention is such that the triphenyltin compound of formula (I) and cuprous oxide and/or cuprous thiocyanate in fine powder form are dispersed in a solution of the resinous vehicle in the organic solvent.

The coating composition of this invention having such a structure can be prepared by a method known per se in the art. For example, (a) the antifouling agent composed of the triphenyltin compound of formula (I) and cuprous oxide and/or cuprous thiocyanate, (b) the resinous vehicle and (c) the organic solvent are charged in the aforesaid proportions into a mixing device such as a ball mill, pebble mill, roll mill, or speed run mill, and mixed with stirring thereby to disperse and homogenize them.

The coating composition of this invention gives a coated film which exhibits a long-lasting antifouling performance as a result of the synergistic action of a specified triphenyltin compound used in combination with cuprous oxide and/or cuprous thiocyanate in a larger weight than the weight of the resinous vehicle. For example, as will be shown clearly by Examples to be given hereinbelow, a coated film formed from the coating composition of this invention continues to release the triphenyltin compound and cuprous oxide and/or cuprous thiocyanate in amounts larger than the critical antifouling values (in the case of the triphenyltin compound, the critical antifouling value is considered to be 1 $\mu g/cm^2/day$, and in the case of cuprous oxide, it is considered to be 10 $\mu g/cm^2/day$) for more than three years, and therefore, can ward off aquatic organisms such as barnacles (Balanus) and green laver (Enteromorpha) for more than three years.

The coating composition of this invention is very stable, and does not result in hard caking even after storage for 6 months at 20° C. Furthermore, the coating formed from the coating composition of this invention has superior water resistance, and shows no cracking nor peeling even when dipped for more than three years in the sea.

The coating composition of this invention thus has superior antifouling properties and superior storage stability, and when applied to a substrate to be in contact with water over prolonged periods of time, for example a submerged surface of a ship, submarine, water tank, fishing net, marine oil base, pier, or raft, at a wet film weight of about 400 to 600 $g/m^2$, can protect the surface from the adhesion or habitation of aquatic organisms, for example Cirripedia such as barnacles (Balanus), Ascidiacea, oysters, and tubeworm, and algae such as green laver (Enteromorpha) and Ulva over an extended period of time.

The following examples further illustrate the present invention.

EXAMPLES 1 TO 10 AND COMPARATIVE EXAMPLES 1 TO 16

1. Preparation of Antifouling Compositions

The ingredients shown in Table 1 were charged into a ball mill in the amounts indicated, and dispersed until the degree of dispersion of the pigments, as measured by a grind gauge, became 60$\mu$ or below.

The parenthesized figures in Table 1 show the amounts of the ingredients used. The resins used in these examples had the following properties.

(A) Styrene-butadiene copolymer

A copolymer composed of 85% by weight of styrene and 15% by weight of butadiene with a number average molecular weight of about 15,000 and an acid value of 0.

(B) Vinyl chloride/isobutylether copolymer

A copolymer composed of 75% by weight of vinyl chloride and 25% by weight of vinyl isobutyl ether with a number average molecular weight of about 20,000 and an acid value of 0.

(C) Vinyl chloride/vinyl acetate copolymer

A copolymer composed of 87% by weight of vinyl chloride and 13% by weight of vinyl acetate with a number average molecular weight of about 20,000 and an acid value of 0.

(D) Methyl methacrylate/styrene copolymer

A copolymer composed of 50% by weight of methyl methacrylate and 50% by weight of styrene with a number average molecular weight of about 11,000 and an acid value of 0.

(E) Primal AC-55 (Trademark, a product of Nippon Acryl Chemical Co.)

A copolymer composed of 50% by weight of ethyl acrylate and 50% by weight of methyl methacrylate of an emulsion type (nonvolatile content 50% by weight) with a number average molecular weight of about 10,000 and an acid value of 0.

(F) High acid value acrylic resin (1)

A copolymer composed of 7% by weight of 2-hydroxyethyl methacrylate, 3% by weight of methacrylic acid, 40% by weight of methyl methacrylate, 30% by weight of styrene and 20% by weight of n-butyl methacrylate with a number average molecular weight of about 12,000 and an acid value of 20.

(G) Low acid value acrylic resin

A copolymer composed of 0.6% by weight of methacrylic acid, 70.4% by weight of methyl methacrylate and 29% by weight of styrene with a number average molecular weight of about 11,000 and an acid value of 5.

(H) High acid value acrylic resin (2)

A copolymer composed of 2% by weight of methacrylic acid, 70% by weight of methyl methacrylate and 28% by weight of styrene with a number average molecular weight of about 11,000 and an acid value of 15.

TABLE 1

| | Composition | Example 1 | Example 2 | Example 3 | Example 4 | Example 5 |
|---|---|---|---|---|---|---|
| Anti-fouling agent | Cuprous oxide | 80 | 80 | 120 | 40 | 60 |
| | Cuprous thiocyanate | — | — | — | — | — |
| | Triphenyltin compound | Triphenyltin hydroxide (20) | Triphenyltin chloride (20) | Triphenyltin acetate (20) | Triphenyltin hydroxide (20) | Triphenyltin chloride (20) |
| Resinous vehicle | Resin | A (18) | B (16) | C (14) | D (14) | A (12) |
| | Plasticizer Tricresyl phosphate | — | — | — | (4) | (6) |
| Other pigments | | — | — | — | Talc (25) | Red iron oxide (5) Talc (5) |
| Solvent | | Xylene (45) | Toluene (20) MIBK* (20) | Toluene (20) MIBK (20) | Xylene (40) | Xylene (40) |
| PVC of the dried coating (%) | | 65 | 67 | 77 | 60 | 61 |

| | Composition | Example 6 | Example 7 | Example 8 | Example 9 | Example 10 |
|---|---|---|---|---|---|---|
| Anti-fouling agent | Cuprous oxide | 100 | 40 | — | 50 | 30 |
| | Cuprous thiocyanate | — | — | 30 | 15 | 20 |
| | Triphenyltin compound | Bis(triphenyltin) oxide (20) | Triphenyltin hydroxide (20) | Triphenyltin hydroxide (20) | Triphenyltin hydroxide (20) | Triphenyltin hydroxide (20) |
| Resinous vehicle | Resin | D (13) | G (14) | A (15) | A (12) | A (18) |
| | Plasticizer | Chlorinated paraffin (3) | Tricresyl phosphate (4) | — | Tricresyl phosphate (4) | — |
| Other pigments | | — | Talc (25) | Red iron oxide (5) Talc (5) | Red iron oxide (5) | — |
| Solvent | | Xylene (40) | Xylene (40) | Xylene (40) | Xylene (40) | Xylene (40) |
| PVC of the dried coating (%) | | 75 | 63 | 66 | 66 | 60 |

| | Composition | Comparative Example 1 | Comparative Example 2 | Comparative Example 3 | Comparative Example 4 | Comparative Example 5 |
|---|---|---|---|---|---|---|
| Anti-fouling agent | Cuprous oxide | 100 | — | 80 | 40 | 25 |
| | Cuprous thiocyanate | — | — | — | — | — |
| | Triphenyltin compound | | Triphenyltin hydroxide (20) | Triphenyltin chloride (20) | Triphenyltin hydroxide (10) | Triphenyltin hydroxide (30) |
| Resinous vehicle | Resin | A (18) | A (18) | B (20) | F (7) | D (18) |
| | Plasticizer | — | — | — | Tricresyl phosphate (1) | Tricresyl phosphate (2) |
| Other pigments | | — | — | — | Talc (2) Red iron oxide (5) | — |
| Solvent | | Xylene (40) | Toluene (20) MIBK (20) | Toluene (20) MIBK (20) | Xylene (35) | Xylene (25) |
| PVC of the dried | | 50 | 50 | 60 | 66 | 57 |

TABLE 1-continued coating (%)

| | Composition | Comparative Example | | | |
|---|---|---|---|---|---|
| | | 6 | 7 | 8 | 9 |
| Anti-fouling agent | Cuprous oxide | 65 | 40 | 40 | 23 |
| | Cuprous thiocyanate | — | — | — | — |
| | Triphenyltin compound | Triphenyltin hydroxide (10) | Triphenyltin hydroxide (10) | Triphenyltin hydroxide (10) | Triphenyltin hydroxide (23) |
| Resinous vehicle | Resin | D (5) | D (3) | D (9) | D (20) |
| | Plasticizer | Tricresyl phosphate (1) | Tricresyl phosphate (1) | Tricresyl phosphate (1) | — |
| Other pigments | | — | Talc (5) Red iron oxide (5) | Talc (5) Red iron oxide (5) | — |
| Solvent | | Xylene (19) | Xylene (36) | Xylene (30) | Xylene (34) |
| PVC of the dried coating (%) | | 76 | 77 | 63 | 48 |

| | Composition | Comparative Example | | | |
|---|---|---|---|---|---|
| | | 10 | 11 | 12 | 13 |
| Anti-fouling agent | Cuprous oxide | 28 | 40 | 25 | 65 |
| | Cuprous thiocyanate | — | — | — | — |
| | Triphenyltin compound | Triphenyltin hydroxide (10) | Triphenyltin hydroxide (10) | Triphenyltin hydroxide (10) | Triphenyltin hydroxide (15) |
| Resinous vehicle | Resin | D (5) | E (7)** | D (5) | D (5) |
| | Plasticizer | Tricresyl phosphate (1) | Tricresyl phosphate (1) | Tricresyl phosphate (1) | Tricresyl phosphate (1) |
| Other pigments | | Talc (42) | Talc (2) Red iron oxide (5) | Talc (10) Red iron oxide (5) | — |
| Solvent | | Xylene (14) | Water (35) | Xylene (44) | Xylene (14) |
| PVC of the dried coating (%) | | 83 | 66 | 70 | 79 |

| | Composition | Comparative Example | | |
|---|---|---|---|---|
| | | 14 | 15 | 16 |
| Anti-fouling agent | Cuprous oxide | 40 | — | — |
| | Cuprous thiocyanate | — | 62 | 30 |
| | Triphenyltin compound | Triphenyltin hydroxide (20) | Triphenyltin hydroxide (10) | Triphenyltin hydroxide (20) |
| Resinous vehicle | Resin | H (14) | A (9) | H (15) |
| | Plasticizer | Tricresyl phosphate (4) | — | — |
| Other pigments | | Talc (25) | — | Red iron oxide (5) Talc (5) |
| Solvent | | Xylene (40) | Xylene (30) | Xylene (40) |
| PVC of the dried coating (%) | | 63 | 76 | 66 |

*MIBK = methyl isobutyl ketone
**The amount of the resin is calculated as solids.

2. Evaluation of the Antifouling Coatings

A sand-blasted steel plate (300×150×2 mm) was coated once with a rust preventive shop primer [SD Zinc Primer ZE No. 100 (organic zinc-rich primer, a trademark for a product of Kansai Paint Co., Ltd.)] to a dry film thickness of 15μ, and then twice with an A/C paint [Epomarine AC (a trademark for an epoxy-type anticorrosive paint, a product of Kansai Paint Co., Ltd.)] to a dry film thickness of 100μ.

Each of the antifouling coating compositions obtained was coated twice on the coated steel plate by brushing to a total dry film thickness of 100μ.

(1) Test on the adhesion of the barnacles and green laver

The coated steel plates were tied to an iron frame by means of vinyl-jacketed electric wires to form a raft-like structure. It was submerged to a depth of 1 m from the water surface in Toba Bay, Mie Prefecture, Japan using ropes. The raft-like structure was withdrawn from the sea at regular intervals, and the adhesion of barnacles and green laver to the coated steel plates was examined.

The results are evaluated by the percentage of the area to which these aquatic organisms adhered.

(2) Measurement of the rates of releasing cuprous oxide or cuprous thiocyanate and the triphenyltin compound

PREPARATION OF A TEST SOLUTION

The same coated steel plates as above (except that the sizes were changed to 10×8.5×0.2 cm) were each dipped in flowing sea water (in which marine organisms such as barnacles and green laver did not exist) for predetermined periods of time (12, 24, and 36 months). The steel plates were then placed in a beaker containing 1 liter of sea water (pH 8.1), and dipped for 3 hours while blowing air into it at a rate of 0.5 liter/min. The coated steel plates were then withdrawn, and the remaining solution was used as a test solution. The copper ion ($Cu^+$) and tin ion ($Sn^{4+}$) dissolved in the test solution were determined by the following methods, and the rates of releasing of cuprous oxide or cuprous thiocyanate and triphenyltin compound are determined as the rates of dissolution of copper and tin ions.

MEASUREMENT OF THE RATE OF RELEASING CUPROUS OXIDE AND CUPROUS THIOCYANATE 50 cc of the test solution was taken into a 100 cc brown measuring flask, and 0.5 cc of a 50% aqueous solution of citric acid was added. The solution was then neutralized with ammonia solution (using a Litmus paper), and its pH was adjusted to 9.0–9.2 by ammonia solution. Then, 2 cc of a 0.1% aqueous solution of sodium diethyldithiocarbamate was added, and the mixture was well shaken to form yellowish brown copper carbamate. Then, 20 cc of methyl isobutyl ketone was added, and the mixture was sufficiently stirred for 5 minutes by a shaker machine, thereby extracting the copper carbamate into the methyl isobutyl ketone layer. Distilled water was added until it completely filled the flask. The methyl isobutyl ketone layer at the narrow tube portion of the flask was taken out be decantation, and then filtered. The filtrate was taken into a cell, and its absorbance was measured by an atomic absorptiometer. The absorbance measured was compared with the absorbance curve of a standard copper solution having a known concentration, and the concentration of copper in the filtrate was thus determined. The rate of releasing copper is calculated by the following equation.

$$\text{Rate of releasing copper } (\mu g/cm^2/day) = \frac{\left(\begin{array}{c}\text{Amount of copper}\\ \text{in sea water}\\ (\mu g/ml)\end{array}\right) \times \left(\begin{array}{c}\text{Amount of}\\ \text{sea water} \times 24\\ (ml)\end{array}\right)}{\left(\begin{array}{c}\text{Area } (cm^2) \text{ of}\\ \text{the test plate}\end{array}\right) \times \left(\begin{array}{c}\text{Dissolving}\\ \text{time}\end{array}\right)}$$

MEASUREMENT OF THE RATE OF RELEASING THE TRIPHENYLTIN COMPOUND 100 ml of the test solution was taken into an evaporating dish with a capacity of 150 ml, and 5 ml of nitric acid and 10 ml of 50% sulfuric acid were added. The mixture was heated to cause decomposition, and subsequently evaporated by heating to generate a white smoke of sulfuric acid and thus concentrated to a solid mass. After cooling, 20 ml of 10% hydrochloric acid was added, and the mixture was heated to form a solution. The solution was placed into a 50 ml measuring flask, and water was added to the indicator line.

20 ml of the resulting solution was taken into each of a 50 ml measuring flask and a 100 ml beaker, and water was added to the solution in the beaker to make the total volume 50 ml. An ethyl alcohol solution (0.05 w/v %) of bromocresol green was used as an indicator, and the solution in the beaker was neutralized with a 15% ammonia solution to determine the amount of the ammonia solution required for neutralization.

A potassium permanganate solution (1 w/v %) was added to the solution in the measuring flask to render it slightly crimson. Then, a small amount of ascorbic acid was added, and the mixture was well shaken to reduce the excess of permanganic acid and iron. Subsequently, 1.5 ml of 10% hydrochloric acid, 5 ml of a citric acid solution (10 w/v %), and a 15% ammonia solution in the amount required for neutralization as determined hereinabove were added. Then, 5 ml of a solution of polyvinyl alcohol (0.5 w/v %) was added, and water was further added to make the total volume 40 ml. Then, 5 ml of an ethyl alcohol solution of phenylfluorone (0.01 w/v %) was added, and water was further added to make the total volume 50 ml. The solution was well shaken, and then allowed to stand for about 20 minutes. The solution was then subjected to a photoelectric colorimeter to measure its absorbance at 510 nm. The absorbance of the solution was compared with the absorbance curve of a standard tin solution of a known concentration, and the concentration of tin was determined. The rate of releasing tin was calculated by the following equation.

$$\text{Rate of releasing tin } (\mu g/cm^2/day) = \frac{\left(\begin{array}{c}\text{Amount of tin}\\ \text{in sea water}\\ (\mu g/ml)\end{array}\right) \times \left(\begin{array}{c}\text{Amount of}\\ \text{sea water}\\ (ml)\end{array}\right) \times 24}{\left(\begin{array}{c}\text{Area } (cm^2) \text{ of}\\ \text{the test plate}\end{array}\right) \times \left(\begin{array}{c}\text{Dissolving}\\ \text{time}\end{array}\right)}$$

(3) Storage stability

Each of the coating compositions prepared as described in section 1 above was stored for 60 days in an incubator held at 20° C. Then, the presence or absence of a precipitate was observed with the naked eye, and the storage stability was evaluated on the following scale.

Good ... The individual ingredients in the coating composition were substantially uniform, and it can be easily stirred.

Poor ... A solid precipitate of pigment components (including the antifouling ingredients) was seen to form in a large quantity, and the composition was difficult to stir.

(4) Condition of the coating

The same test plates as used in the test on adhesion of barnacles and green laver were used. They were submerged into the sea, and withdrawn at regular intervals to observe the condition of the coating with the naked eye. The condition of the coating was evaluated on the following scale.

Good ... No charge was observed.

Poor ... Defects such as cracking or peeling were observed.

The results of the above tests were summarized in Table 2.

TABLE 2

| | | Test item | | | | | |
|---|---|---|---|---|---|---|---|
| | | Adhesion of barnacles (%) | | | Adhesion of green laver (%) | | |
| | | Period (month) of dipping | | | | | |
| | | 12 | 24 | 26 | 12 | 24 | 36 |
| Example | 1 | 0 | 0 | 0 | 0 | 0 | 0 |
| | 2 | 0 | 0 | 0 | 0 | 0 | 0 |
| | 3 | 0 | 0 | 0 | 0 | 0 | 0 |
| | 4 | 0 | 0 | 0 | 0 | 0 | 0 |
| | 5 | 0 | 0 | 0 | 0 | 0 | 0 |
| | 6 | 0 | 0 | 0 | 0 | 0 | 0 |
| | 7 | 0 | 0 | 0 | 0 | 0 | 0 |
| | 8 | 0 | 0 | 0 | 0 | 0 | 0 |
| | 9 | 0 | 0 | 0 | 0 | 0 | 0 |
| | 10 | 0 | 0 | 0 | 0 | 0 | 0 |
| Comparative Example | 1 | 0 | 5 | 30 | 0 | 50 | 100 |
| | 2 | 0 | 10 | 40 | 0 | 100 | 100 |
| | 3 | 0 | 5 | 20 | 0 | 5 | 20 |
| | 4 | 0 | 20 | 50 | 0 | 50 | 100 |
| | 5 | 0 | 2 | 20 | 0 | 5 | 20 |
| | 6 | 0 | 3 | 25 | 0 | 6 | 25 |

TABLE 2-continued

|   | 7 | 0 | 0 | 15 | 0 | 0 | 15 |
|---|---|---|---|----|---|---|-----|
|   | 8 | 0 | 5 | 20 | 0 | 5 | 20 |
|   | 9 | 0 | 10 | 30 | 0 | 20 | 50 |
|   | 10 | 0 | 0 | 15 | 0 | 0 | 15 |
|   | 11 | 0 | 30 | 70 | 0 | 50 | 100 |
|   | 12 | 0 | 5 | 30 | 0 | 10 | 30 |
|   | 13 | 0 | 0 | 15 | 0 | 0 | 15 |
|   | 14 | 10 | 50 | 80 | 15 | 60 | 100 |
|   | 15 | 0 | 5 | 25 | 0 | 10 | 30 |
|   | 16 | 10 | 60 | 80 | 20 | 50 | 100 |

| | | Test item | | | | |
|---|---|---|---|---|---|---|
| | | Rate of releasing copper ($\mu g/cm^2/day$) | | | Rate of releasing organic tin ($\eta g/cm^2/day$) | | |
| | | Period (month) of dipping | | | | | |
| | | 12 | 24 | 36 | 12 | 24 | 36 |
| Example | 1 | 10.6 | 10.2 | 10.0 | 1.2 | 1.1 | 1.3 |
| | 2 | 12.5 | 11.6 | 11.0 | 1.4 | 1.3 | 1.1 |
| | 3 | 11.2 | 10.4 | 10.2 | 1.5 | 1.3 | 1.2 |
| | 4 | 10.6 | 10.6 | 10.0 | 1.1 | 1.0 | 1.1 |
| | 5 | 11.7 | 10.2 | 11.0 | 1.6 | 1.0 | 1.2 |
| | 6 | 10.6 | 10.2 | 10.0 | 1.3 | 1.2 | 1.0 |
| | 7 | 10.6 | 10.5 | 10.0 | 1.1 | 1.1 | 1.0 |
| | 8 | 10.5 | 10.3 | 10.0 | 1.3 | 1.1 | 1.3 |
| | 9 | 11.0 | 10.5 | 10.2 | 1.5 | 1.4 | 1.1 |
| | 10 | 10.8 | 10.8 | 10.1 | 1.2 | 1.1 | 1.3 |
| Comparative Example | 1 | 12.0 | 9.5 | 3.0 | — | — | — |
| | 2 | — | — | — | 1.0 | 0.5 | 0.3 |
| | 3 | 10.4 | 8.6 | 6.5 | 1.2 | 0.7 | 0.7 |
| | 4 | 11.0 | 4.3 | 2.5 | 0.7 | 0.3 | 0.1 |
| | 5 | 12.5 | 8.9 | 5.2 | 1.3 | 0.8 | 0.5 |
| | 6 | 12.1 | 9.1 | 5.1 | 1.4 | 0.7 | 0.4 |
| | 7 | 15.3 | 11.0 | 8.9 | 1.3 | 1.1 | 0.7 |
| | 8 | 10.4 | 8.6 | 6.5 | 1.2 | 0.7 | 0.7 |
| | 9 | 10.5 | 7.2 | 4.0 | 1.2 | 0.5 | 0.2 |
| | 10 | 13.1 | 11.8 | 8.5 | 1.3 | 1.0 | 0.8 |
| | 11 | 10.5 | 5.0 | 1.3 | 0.9 | 0.3 | 0.1 |
| | 12 | 11.6 | 8.0 | 3.4 | 1.2 | 0.5 | 0.2 |
| | 13 | 14.1 | 12.3 | 9.3 | 1.3 | 1.1 | 0.8 |
| | 14 | 9.8 | 7.5 | 4.5 | 0.9 | 0.5 | 0.1 |
| | 15 | 12.1 | 8.5 | 5.0 | 1.4 | 0.6 | 0.4 |
| | 16 | 9.5 | 6.5 | 3.5 | 0.7 | 0.3 | 0.1 |

| | | Storage stability 6 months/20° C. | Condition of the coating after 36-month dipping in sea water |
|---|---|---|---|
| Example | 1 | Good | Good |
| | 2 | Good | Good |
| | 3 | Good | Good |
| | 4 | Good | Good |
| | 5 | Good | Good |
| | 6 | Good | Good |
| | 7 | Good | Good |
| | 8 | Good | Good |
| | 9 | Good | Good |
| | 10 | Good | Good |
| Comparative Example | 1 | Poor | Poor |
| | 2 | Good | Good |
| | 3 | Poor | Poor |
| | 4 | Good | Good |
| | 5 | Good | Good |
| | 6 | Poor | Poor |
| | 7 | Poor | Poor |
| | 8 | Good | Good |
| | 9 | Good | Good |
| | 10 | Poor | Poor |
| | 11 | Poor | Poor |
| | 12 | Good | Good |
| | 13 | Poor | Poor |
| | 14 | Good | Good |
| | 15 | Poor | Poor |
| | 16 | Good | Good |

What we claim is:

1. An antifouling coating composition comprising (A) an antifouling agent composed of (i) 10 parts by weight of a triphenyltin compound of the formula

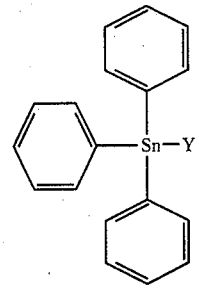

(I)

wherein Y represents —OH, halogen,

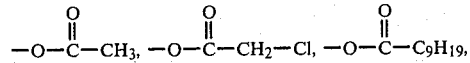

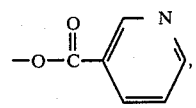

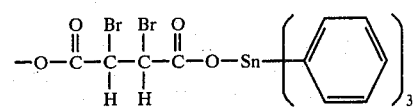

or 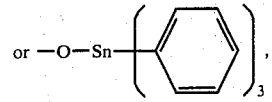

and (ii) 10 to 60 parts by weight of cuprous oxide and/or cuprous thiocyanate, (B) a resinous vehicle composed of a resin having an acid value of not more than 10 as a main ingredient, and (C) an organic solvent, said resinous vehicle being present in an amount of 6 to 9 parts by weight per 10 parts by weight of the triphenyltin compound, said antifouling agent amounting to 37 to 75% by weight based on the weight of the coating composition, and said composition having a pigment volume concentration of 50 to 80% by volume.

2. The composition of claim 1 wherein the triphenyltin compound is triphenyltin hydroxide or triphenyltin chloride.

3. The composition of claim 1 wherein the resinous vehicle is a resin having an acid value of not more than 10, or a mixture of said resin with a carboxyl-free plasticizer.

4. The composition of claim 1 wherein the organic solvent is an aromatic hydrocarbon, ketone, ester or alcohol.

5. The composition of claim 1 wherein the amount of the antifouling agent is 40 to 73% by weight based on the weight of the coating composition.

6. The composition of claim 1 which has a pigment volume concentration of 60 to 80% by volume.

7. The composition of claim 1 which further comprises a pigment.

8. A method for protecting the surface of a substrate from the adhesion of aquatic organisms, which comprises coating said substrate surface with the coating composition of claim 1.

9. The composition of claim 1 wherein the resin is an olefinic resin.

10. The composition of claim 1 wherein the resin is a film-forming resin.

11. The composition of claim 1 wherein the resin is an acrylic resin.

12. The composition of claim 1 wherein the resin is a vinyl resin.

13. The composition of claim 1 wherein the resin is a diene-type resin.

14. The composition of claim 1 wherein the resin is a rubber-type resin.

* * * * *